Nov. 11, 1924.  1,514,720
H. C. PAULY
BICYCLE
Filed Dec. 22, 1923
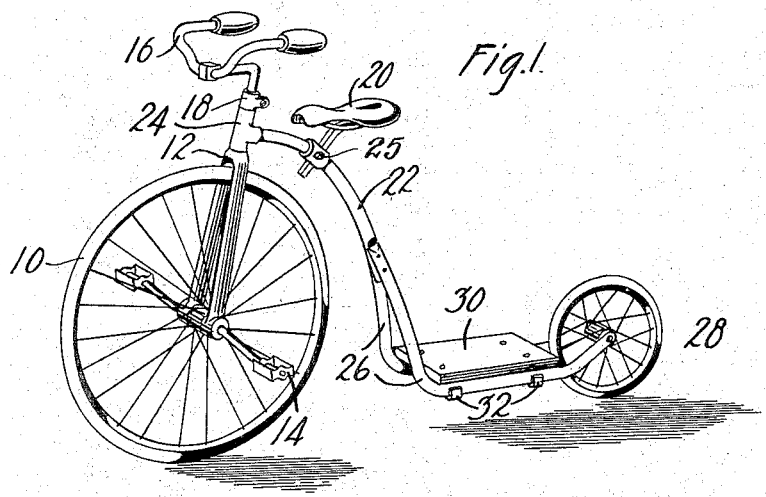
Fig.1.
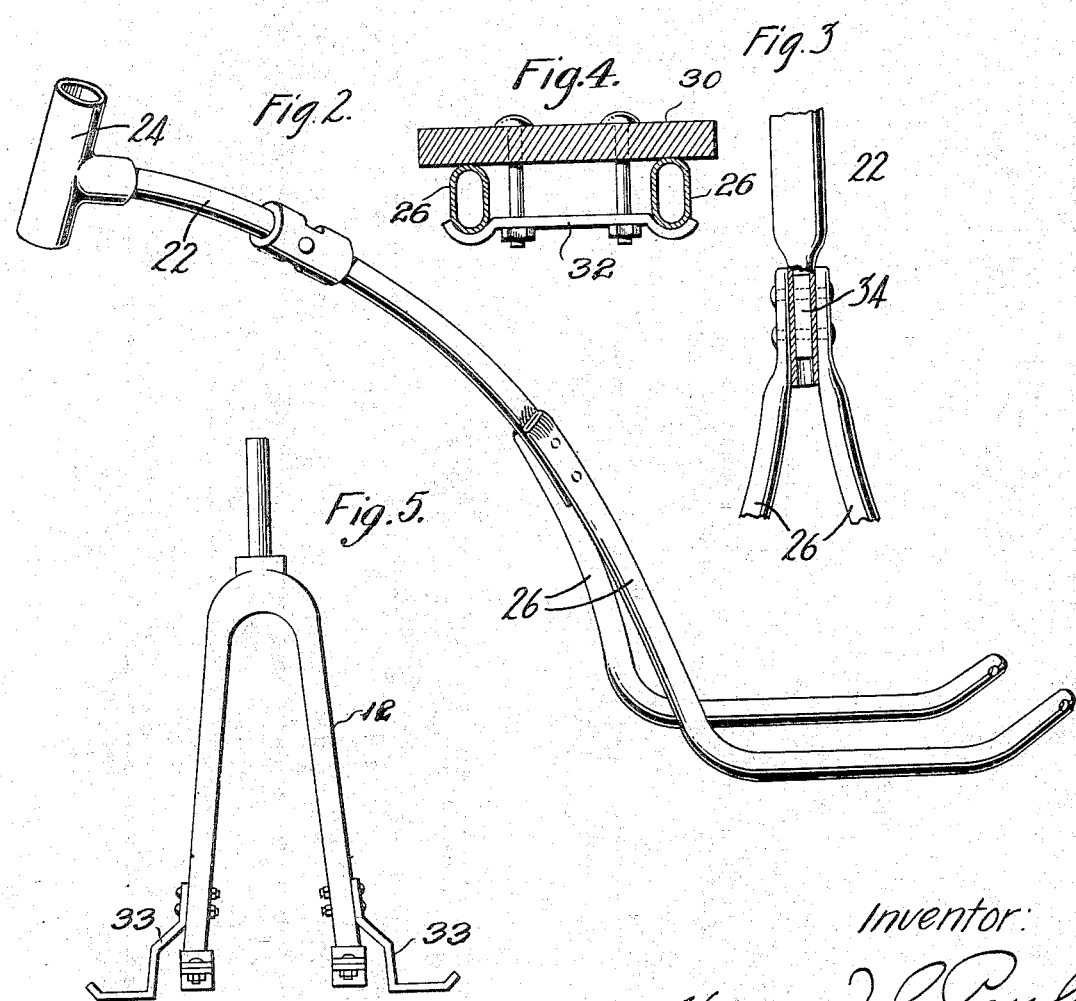
Inventor:
Howard C. Pauly Patented Nov. 11, 1924.

1,514,720

UNITED STATES PATENT OFFICE.

HOWARD C. PAULY, OF MONTCLAIR, NEW JERSEY.

BICYCLE.

Application filed December 22, 1922. Serial No. 608,411.

*To all whom it may concern:*

Be it known that I, HOWARD C. PAULY, a citizen of the United States of America, residing at Montclair, in the county of Essex and State of New Jersey, have invented certain new and useful Improvements in Bicycles, of which the following is a full, clear, concise, and exact description.

This invention relates to a combined bicycle and coaster which is particularly adapted for the use of children.

An object of the invention is to combine in a single device the functions of a bicycle operated by power applied to one of its wheels and of a coaster or so-called "pusher" which may be propelled by pushing on the ground with one foot.

A further object of the invention is the provision of a frame member which is adapted to be assembled with standard parts now on the market to form a device of the above character.

In the preferred form of the invention, two wheels are employed, the front wheel assembly being similar to that usually employed in three wheel velocipedes. The frame is longer than that of the ordinary velocipede and carries between the front and rear wheels, a platform or step for receiving a child's foot. This step is in the common vertical plane of the wheels and is preferably lower than the axis of the smaller rear wheel. The front wheel is provided with pedals and a seat is placed in a convenient position with respect to the pedals. The handle bars are in position to be held by the rider both when standing on the platform and when sitting on the seat.

An arrangement is thus provided which can be used by the child as a "pusher" or as a bicycle at will. On account of the ease with which the change can be made from one method of operation to the other, the difficulties in learning to ride a bicycle are practically all removed. The average six year old child, without previous experience, can learn to ride the device as a bicycle in a very few minutes.

Further objects of the invention will appear from the following detailed description and claims taken in connection with the accompanying drawings, in which Fig. 1 is a perspective view of a bicycle embodying the invention, Fig. 2 is a perspective view of the main frame member on a larger scale than Fig. 1, Fig. 3 is a detail view of a joint in the frame, Fig. 4 is a transverse section through the step showing the method of attaching the step to the frame, and Fig. 5 is a detail view of the front fork showing a modification.

Referring to the drawings by reference numerals, the front wheel 10 is mounted on a fork 12 and is provided with pedals 14. Handle bars 16 are secured by a clamp 18 in the usual stem or shaft at the upper part of fork 12. The parts just mentioned are standard parts used in children's velocipedes. This is also true of the seat 20 and the upper frame member 22 with the sleeve 24 in which the fork 12 is pivotally mounted. The seat 20 may be secured at the desired height by means of a set screw 25, which also permits its easy removal.

The frame member 22 is usually curved, as shown, and has joined to it in any suitable manner, a pair of frame members 26. The forward portions of members 26 are upturned so as to extend in the general direction of the lower portion of member 22. They comprise also elongated horizontal portions and are slightly upturned at their rear ends. The rear wheel 28 which may be of the type and size used in children's coasters is mounted in suitable openings in the rear terminals of the frame. A step or small platform large enough to receive the child's foot, is mounted on the horizontal portion of the frame and secured thereto by suitable means such as the clamps indicated at 32.

A suitable manner of joining the frame members is indicated in Fig. 3 where the members 22 and 26 are shown as formed of tubing flattened at the joint, a flat piece of metal 34 being inserted in the larger member 22 for additional strength. Other ways of making the frame will be obvious to one skilled in the art. The tubular construction shown is merely illustrative and, of course, the Y-joint may be of any suitable form and may be placed at any desired point between the rear wheel and the front fork.

As will be readily understood, the child places one foot on the step 30, grasping the handle bars and pushes on the ground with the other foot until a certain momentum is attained. If he is already accustomed to guiding a coaster, he will easily assume a sitting position with his feet on the pedals and immediately operate the device as a bicycle. If he is not accustomed to using a coaster, he will usually continue to keep one foot on the ground until he has gained facility in guiding the cycle when he will have no difficulty in learning to use it as a pedal-operated bicycle.

If so desired, the seat can be removed until such time as the child becomes proficient in the steering and general use of the device as a "pusher". In this condition it has been noted that the older boys place one foot on the step and reach forward to one of the pedals with the other foot, thus propelling the cycle from a standing position.

Since the step 30 is located in alignment with the wheels and very near the ground, it is easy to maintain equilibrium when going at slow speeds as when starting and stopping. The longer wheel base also stabilizes the cycle, especially when encountering obstruction in the road or riding off curb stones.

While only one embodiment of the invention has been disclosed, it obviously is capable of assuming other forms within scope and spirit of the appended claims. For example, the pedals for operating the front wheel may be omitted and the device used as a coaster, the seat being retained and any suitable foot rests being provided, such as those indicated at 33 in Fig. 5.

What is claimed is:

1. A bicycle having a front wheel and a rear wheel normally in alignment with each other, a step between said wheels and having provision for receiving a rider's foot in the common vertical plane of said wheels, a seat, and pedal-operated mechanism connected to one of said wheels, said seat being mounted on said bicyle in position for operation of said mechanism by a rider seated thereon, the scope above and at both sides of said step being free and unobstructed.

2. A bicycle having a front wheel and a rear wheel normally in alignment with each other, a step between said wheels for receiving a rider's foot in the common vertical plane of said wheels, a seat mounted in alignment with said wheels, and handle bars connected to said front wheel and being operable either from said seat or from said step, the space above and at both sides of said step being free and unobstructed.

3. In a bicycle, front and rear wheels normally in alignment with each other, pedals for operating said front wheel, a frame comprising an elevated portion adjacent said front wheel, a seat mountel on said elevated portion, and a step mounted on said frame, and having provision for receiving a rider's foot in a position between and in alignment with said wheels, the space above and at both sides of said step being free and unobstructed.

4. A vehicle frame having a substantially horizontal portion, and an inclined portion rising from said horizontal portion, a step mounted on said horizontal portion, means at the free end of said inclined portion for pivotally mounting a front runner unit, means for attaching a seat to the rear of said pivotal mounting, and means for mounting a runner at the rear of said horizontal portion, said step having provision for holding a rider's foot between said runners and in the common vertical plane of their tread portions, the space above and at both sides of said step being free and unobstructed.

In witness whereof, I hereunto subscribe my name this 21st day of December, A. D., 1922.

HOWARD C. PAULY.